C. M. CROOK.
AUTOMATIC TIME INDICATING AND SIGNALING DEVICE.
APPLICATION FILED JAN. 16, 1918.

1,383,533.

Patented July 5, 1921.

C. M. CROOK.
AUTOMATIC TIME INDICATING AND SIGNALING DEVICE.
APPLICATION FILED JAN. 16, 1918.

1,383,533.

Patented July 5, 1921.

C. M. CROOK.
AUTOMATIC TIME INDICATING AND SIGNALING DEVICE.
APPLICATION FILED JAN. 16, 1918.

1,383,533.

Patented July 5, 1921.
7 SHEETS—SHEET 3.

C. M. CROOK.
AUTOMATIC TIME INDICATING AND SIGNALING DEVICE.
APPLICATION FILED JAN. 16, 1918.

1,383,533.

Patented July 5, 1921.

C. M. CROOK.
AUTOMATIC TIME INDICATING AND SIGNALING DEVICE.
APPLICATION FILED JAN. 16, 1918.

1,383,533.

Patented July 5, 1921.
7 SHEETS—SHEET 5.

Witness:
Chas. R. Koursh.

Inventor.
Charles M. Crook,
By Jams. Addington Aner Herbold Attys.

UNITED STATES PATENT OFFICE.

CHARLES M. CROOK, OF CHICAGO, ILLINOIS.

AUTOMATIC TIME-INDICATING AND SIGNALING DEVICE.

1,383,533.     Specification of Letters Patent.     Patented July 5, 1921.

Application filed January 16, 1918. Serial No. 212,060.

*To all whom it may concern:*

Be it known that I, CHARLES M. CROOK, a citizen of the United States, residing at Chicago, in the county of Cook and State of Illinois, have invented new and useful Improvements in Automatic Time-Indicating and Signaling Devices, of which the following is a full, clear, concise, and exact description, reference being had to the accompanying drawing, forming a part of this specification.

My invention relates to improvements in automatic time-indicating and signaling devices, and is particularly adapted for use in connection with timing processes, and the like. One of the objects of my invention is to provide a time-indicating and signaling device which may be set to give a signal after the lapse of a predetermined period. Another object of my invention is the provision of a device which will indicate the expiration of a predetermined period and which will at any interval during the period indicate how much time remains before the end of the period. Another object of my invention is the provision of means for causing different instrumentalities to operate after the lapse of a predetermined period. Still another object of my invention is to provide means for removing various processes from the control of the operator after the process has once started, and to prevent the stopping of the process until the expiration of a predetermined time. Various other objects of my invention will appear in the accompanying specification.

For the purpose of disclosing my invention, I have illustrated one embodiment thereof in the accompanying drawings, in which—

Figures 1, 2:
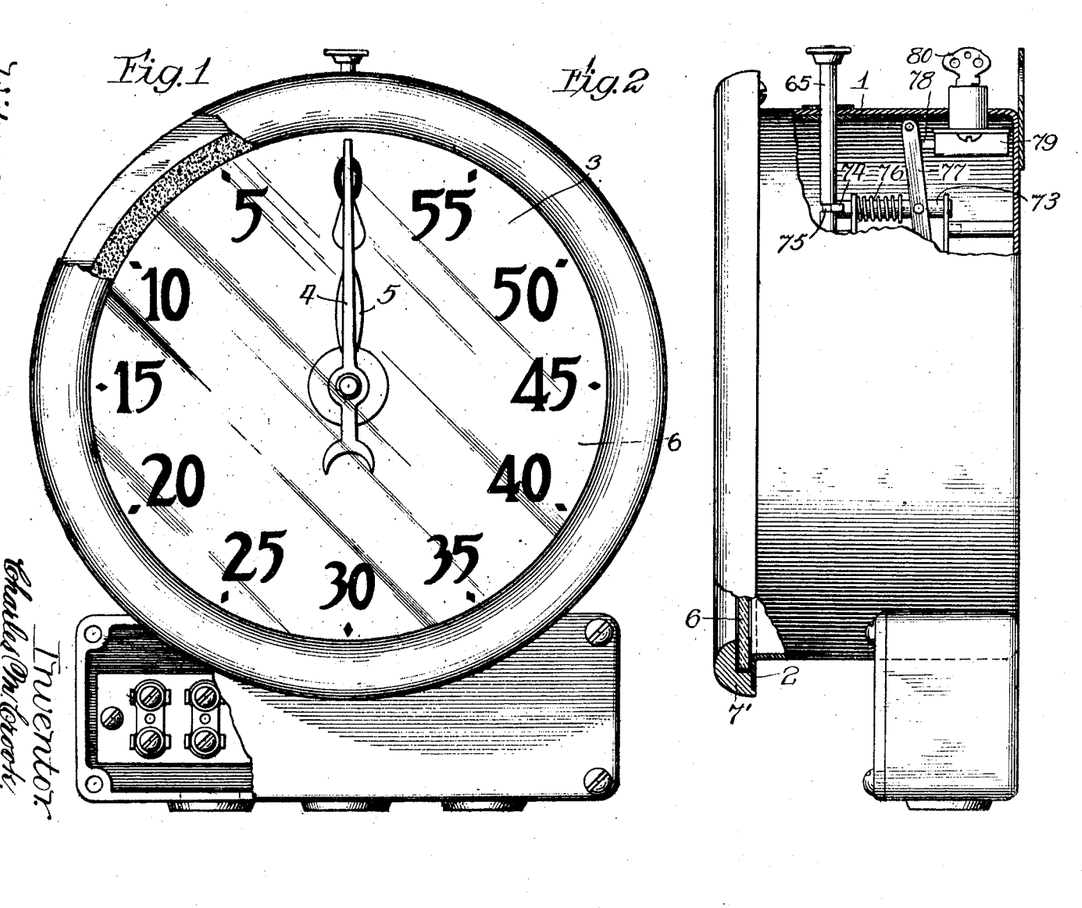
Figure 1 is a front elevation of an indicating device embodying my invention.
Fig. 2 is a side elevation thereof, a part of the frame being broken away to show the locking mechanism.

The indicating mechanism is mounted within a suitable inclosing casing 1, preferably cylindrical in shape and formed from a single piece of sheet metal. The front edge of this casing is flanged over, as at 2. Within the casing is mounted the operating mechanism, which mechanism is mounted behind a dial 3 arranged within the casing and coöperating with a pair of indicating hands or fingers 4 and 5. The finger 4 may be designated as a time-indicating finger, while the finger 5 may be designated as the setting finger. The dial in the structure illustrated is divided into minute intervals, the five-minute intervals being numbered and the numbers progressing from zero to 55 in a counter-clockwise direction. This casing is closed by a suitable glass front 6, which rests at its edges upon the flange 2 and is held in place by a holding ring 7', packing material, such as felt or the like, being interposed between the glass, case and the packing ring to make a dust-proof joint.

When the time-indicating hand 4 has completed its cycle of movement, a suitable circuit is closed for sounding an alarm or closing the circuit through a visual signal, or both, or for causing the operation of other instrumentalities. In order to understand the operation of the apparatus, we will assume that the apparatus is intended to indicate and control the vulcanizing process of rubber tires. These tires are usually placed in a vulcanizing press, after which the press is closed and steam or heat admitted to the molds of the press for a predetermined length of time, thereby "cooking" the tires to the proper vulcanizing point. It is important that these tires should not be undercooked, and therefore desirable to provide means for showing the exact time which elapses during each cooking process and for indicating the end of the cooking period. We will assume that the cooking period is about 40 minutes. The operator sets the setting hand 5 at the numeral 40. This then is the zero point from which the time-indicating hand starts. As soon as the process is started the indicating mechanism is started and the time-indicating hand 4 moves around the dial from the zero point 40 until it arrives at the end of its cycle of movement. It will be noted that due to the arrangement of the figures on the dial the operator will be informed at any interval during the period just how much time is left before the process will be completed. This is done without the operator having to stop to calculate the amount of time left. In other words, it is indicated at a glance, and the operator does not have to stop to subtract the number of minutes elapsed from the number of minutes that the process has to run, to find out just how much more time must elapse before the completion of the process. The operator is thereby enabled to make ready to remove the tire from the press immediately upon the completion of the process. When the time-indicating hand 4 arrives at the end of its cycle of movement, a suitable circuit is closed to sound an alarm or to light a lamp, and in one embodiment of my invention, to automatically cause the stopping of the process, thereby preventing the overcooking of the tire.

Figure 3:
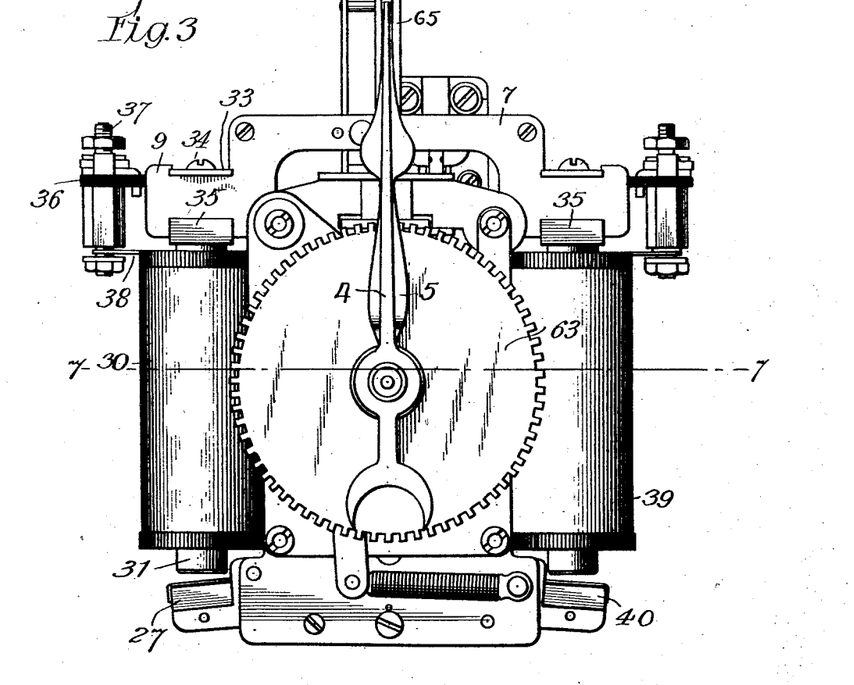
Fig. 3 is a front elevation of the operating mechanism of my indicating device.
Figure 4:
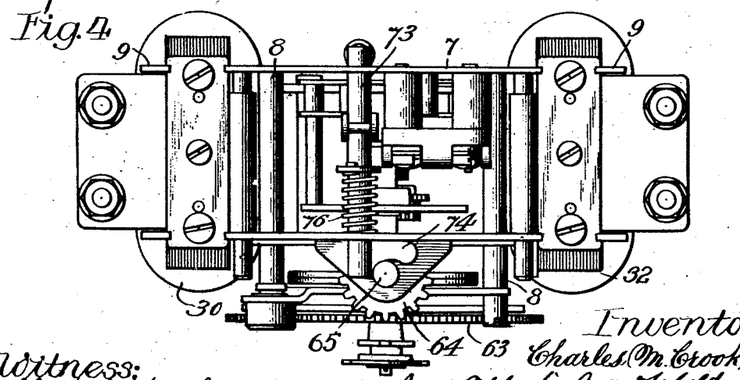
Fig. 4 is a top plan view thereof.
Figure 5:
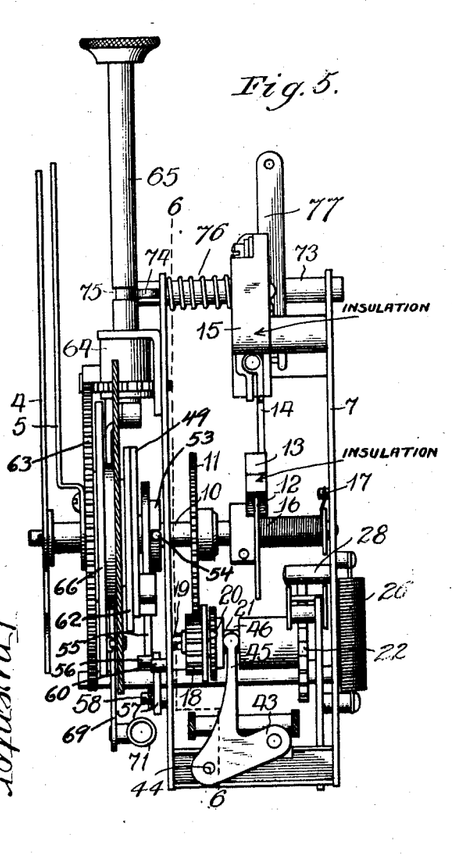
Fig. 5 is a side elevation of the indicating operating mechanism.
Figure 6:
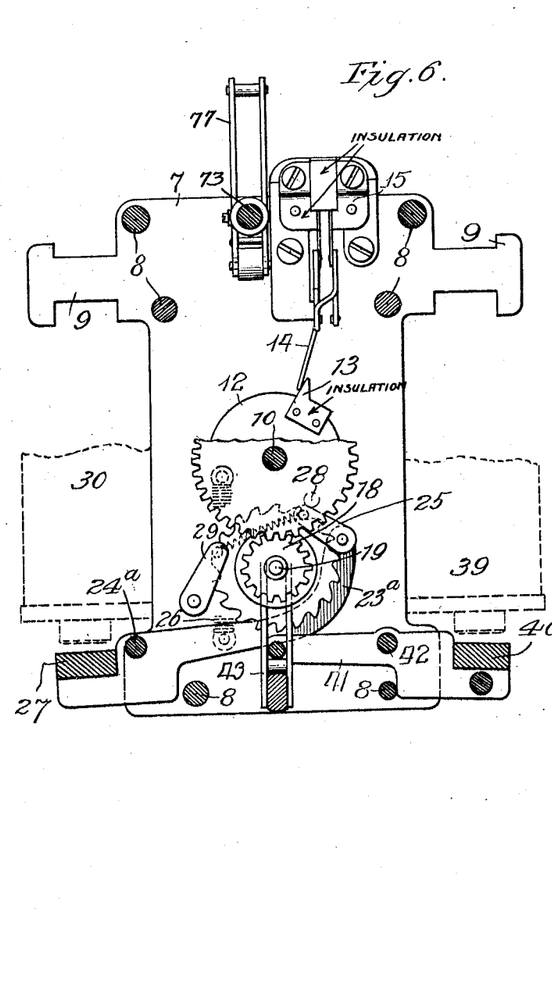
Fig. 6 is a sectional view taken on the line 6—6 of Fig. 5.
Figures 7, 10:
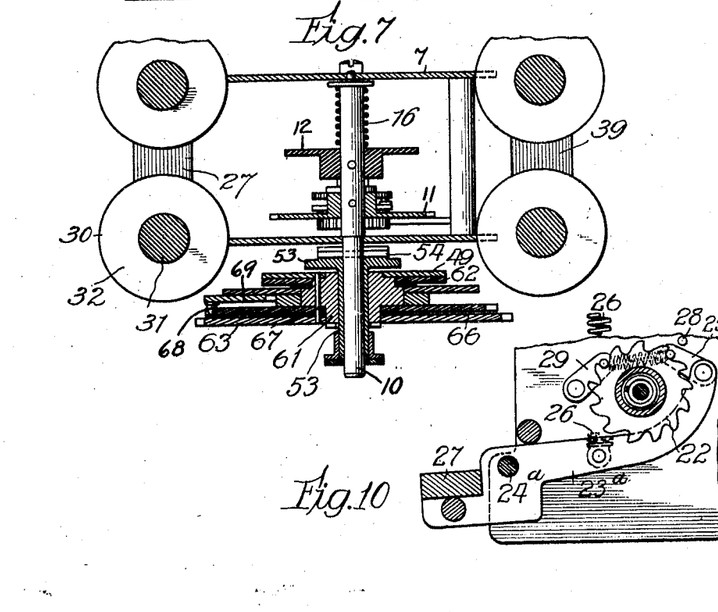
Fig. 7 is a sectional view taken on the line 7—7 of Fig. 3.
Fig. 10 is a detail view of the operating or driving mechanism.

The operating mechanism for the indicator is mounted within the casing 1 upon a suitable frame comprising the front and back plates 7. These two plates are held together and spaced apart by suitable connecting rods 8, and at their upper portion are provided with laterally-extending parallel arms 9 on each side. Mounted on this frame is a rotating driven shaft 10 (see Fig. 5) which has rigidly mounted thereon a driven gear wheel 11, and a trigger wheel 12, which carries an insulating trigger 13. This shaft operates the time-indicating hand 4, and the trigger 13 is so spaced on the wheel 12, which wheel rotates with the shaft 10, that when the hand has completed the cycle of its movement the trigger engages a finger 14 of one member of a suitable switch 15 to close the contacts of this switch. The shaft 10 has also mounted thereon a coiled spring 16, one end of which is connected to the wheel 12 and the opposite end to a pin 17 on the rear plate of the frame, whereby as the shaft is rotated in a clockwise direction the spring 16 will be wound or placed under a tension to rotate the shaft, when released, in a counter-clockwise direction. The driven wheel 11 meshes with a pinion 18 mounted on a counter-shaft 19. This pinion has one member of a clutch in the form of a pin 20 mounted thereon. The pinion 18 is loosely mounted on the shaft 19 and the clutch pin 20 is adapted to engage with the teeth of a clutch wheel 21, the hub of which is provided with a ratchet wheel 22. The clutch wheel 21 is held in clutch engagement with the pinion 18 by means of a coiled spring 23 arranged within the hub of the wheel 21 and having one end abutting against a shoulder formed in the hub and the other end against a stop 24 fastened on the shaft 19. By this arrangement the pinion 18 is driven with the ratchet wheel 22. This ratchet wheel is rotated by means of an operating lever 23ª pivoted at 24ª to the frame and carrying at one end a dog 25 adapted to engage the teeth of the ratchet-wheel. A coiled spring 26 having one end connected to the frame and the other to the lever tends to move the lever in a direction to cause the ratchet-wheel 22 to rotate in a counter-clockwise direction. The lever 23ª is oscillated in an opposite direction by means of an electromagnet, the armature 27 of which is mounted upon the end of the lever opposite the dog 25. This dog 25, when it reaches the limit of its forward movement, engages beneath a pin 28 and is thereby wedged against the ratchet-wheel 22 to prevent the rotation of the ratchet-wheel except by the dog. A second dog 29, disposed opposite the dog 25, also engages the teeth 22 and prevents the back lash of this wheel. The electromagnet 30 operating the arm 27 comprises a pair of iron cores 31, each of which is provided with a suitable winding or spool 32. These cores are supported from one pair of the laterally-extending arms 9 by a bridge-piece 33 extending across the top of the arms and having passing therethrough and into the cores supporting screws 34. The cross-bar 35 on the under side of the arms 9 closes the magnetic circuit of the two cores at the upper end of the magnet. The cross-arm 33 also provides a support for the binding-posts of the magnet, an insulating shelf 36 being secured thereto and supporting a pair of binding-posts 37 for the magnet, the opposite ends of these binding-posts being connected, as at 38, with the opposite terminals of the electromagnet. This electromagnet is intended to have its circuit closed at regular intervals, and in the particular indicator illustrated the circuit of this magnet is adapted to be closed once every minute, thereby rotating the shaft 10 in a clockwise direction one step a minute.

After the shaft 10 has completed the cycle of its movement and the switch 15 closed, the shaft may be returned to its starting position, under the influence of the coiled spring 16, by disconnecting the teeth of the clutch-wheel 21 from the pin 20, thereby leaving the shaft free to rotate in a counter-clockwise direction. This is accomplished by means of an electromagnet 39 of the same general construction as the electromagnet 30 mounted on the opposite side of the frame of said electromagnet. The armature 40 of the magnet 39 is mounted on one end of a lever 41 pivoted at 42 to the frame. The opposite end of this lever bears upon one end 43 of a bell-crank lever pivoted at 44 on the frame. The opposite leg 45 of this lever is bifurcated and the two arms thereof fit within an annular slot 46 formed in the hub of the wheel 21, so that when the electromagnet attracts its armature the bifurcated arm 45 moves in a rearward direction, thereby moving the toothed wheel 21 out of engagement with the pin 20 to release the shaft 10.

Figure 8:
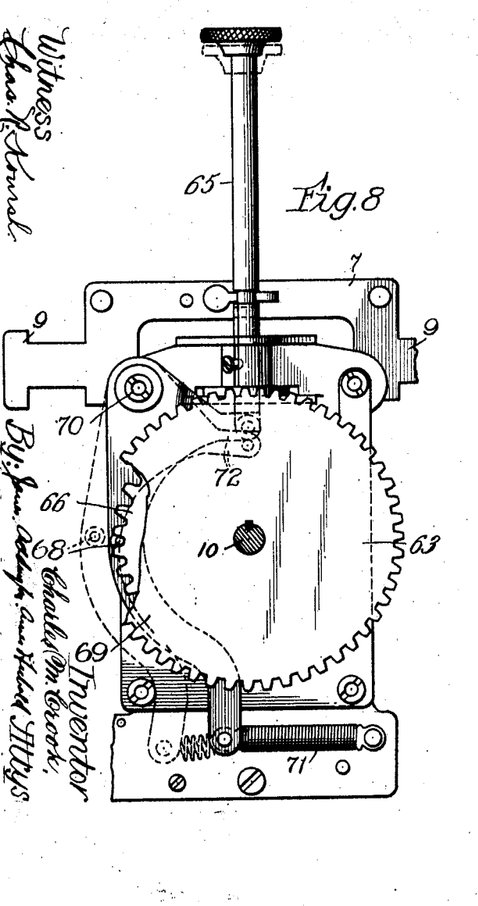
Fig. 8 is a detail view of the setting mechanism.
Figure 9:
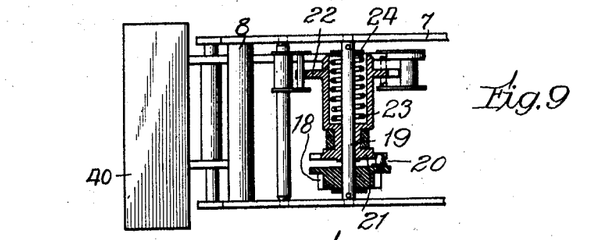
Fig. 9 is a detail sectional view of the clutch for the driving mechanism.
Figure 11:
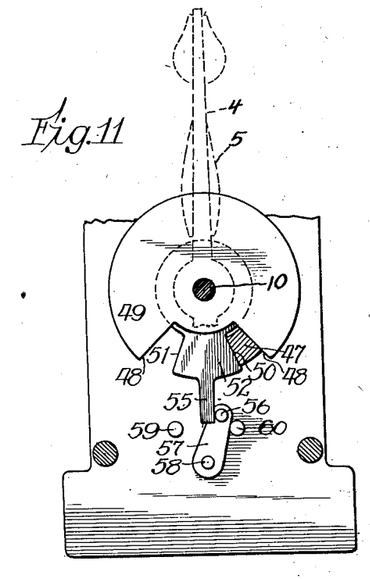
Figs. 11, 12, 13 and 14 are views showing the indicating mechanism in different indicating positions.
Figure 12:
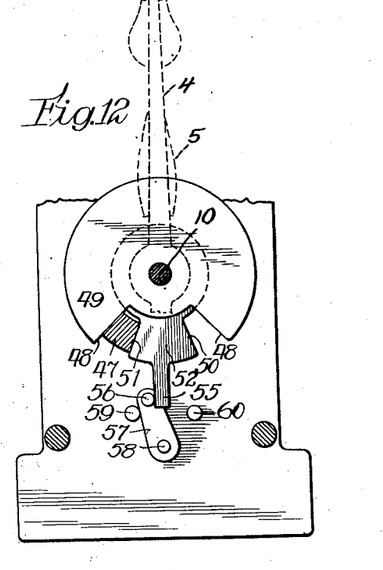
Figure 13:
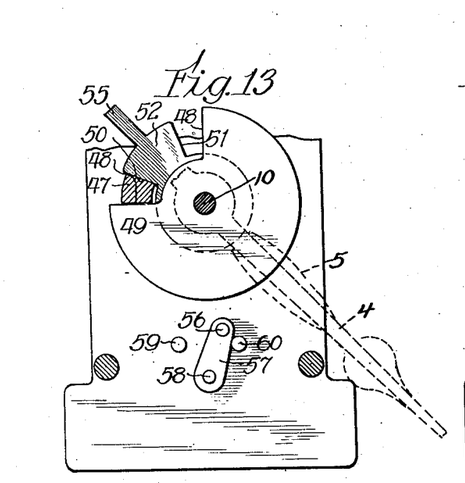
Figure 14:
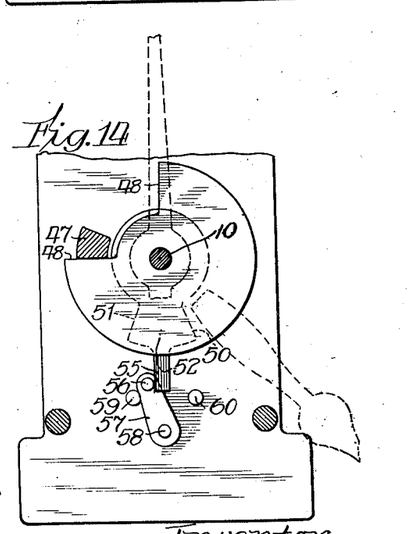

The point at which the cycle of the rotation of the shaft commences its operation may be adjusted by means of a suitable adjustable stop 47 which is adapted to be engaged by the shoulders 48 formed on a wheel 49 rotatably adjustable, and likewise to be engaged by the shoulders 50 and 51 of a stop-finger 52 mounted to rotate with the shaft 10. This stop-finger is mounted on a hub 53 surrounding the shaft 10 and provided with a transverse slot fitting over a pin 54 extending through said shaft, so that the hub 53 and shaft rotate together. The finger 52 has an extension 55 adapted at the extreme limits of movement of the shaft in either direction to engage a movable stop-pin 56 mounted on an arm 57 pivotally supported at 58 on the frame. This arm moves or oscillates between a pair of pins 59 and 60 mounted on the frame, and has the slight oscillating movement back and forth, so that the pin will always stop at a center position when stopped by the arm in either direction. Mounted on the hub 53, but rotatably independent thereof, is a second hub 61, which carries the disk 49 and the disk 62, on which is mounted the stop 47. The disk 49 is rigidly mounted on the hub 61 while the disk 62 is free to rotate thereon, it being stopped in its rotatable movement by the shoulders 48 on the disk 49. Also mounted on the hub 61 is a gear-wheel 63 adapted to mesh with and be driven by a pinion 64, which pinion is rotated by the arm or rod 65. It is thus seen that by rotating the gear-wheel 63 the position of the shoulders 48 may be adjusted, and likewise the point at which the stop-member 47 is stopped may be adjusted. The hub 61 carries, in addition to the gear-wheel 63, a toothed wheel 66 also adapted to rotate with the hub. In order to insure the simultaneous rotation of the wheel 63, the wheel 66 and the disk 49, these three members are all secured to the hub by means of suitable securing pins 67 which pass through the hub and through these three wheels. The toothed wheel 66 is adapted to be engaged by a stop-pin 68, for holding the parts in any position to which they may be adjusted. This pin 68 is mounted on a bell-crank lever 69 pivoted at 70 to the frame and having attached to the end of one leg one end of a spring 71, the opposite end of the spring being secured to the frame, so that the pin 68 will always, under normal conditions, be held in engagement with the teeth on the wheel 66. In order to release the gear-wheel 63 so that it may be rotated by the pinion 64, the rod 65 is vertically movable and its lower end engages with the leg 72 of the bell-crank lever, whereby the depression of the rod will move the pin 68 out of engagement with the teeth and the rotation of the rod through the pinion 64 will drive or rotate the wheel 63 in any direction. The time-indicating hand 4 is mounted on the shaft 10 and corresponds in its position on the dial with the position of the trigger 13 with relation to the switch 14. The setting-finger 5 is mounted on the wheel 63 and its position on the dial corresponds to the position of the stop-member 52.

The rod 65, after the wheel 63 has been rotated to set the stop at a predetermined point to determine the length of time the mechanism will run, may be locked against further adjustment from the exterior of the case by means of a plunger 73. This plunger at its forward end is provided with a latch 74, adapted, when the plunger is projected, to fit in an annular groove 75 in the rod 65 to prevent depression of the rod. The plunger is normally held in a retracted position by means of a coiled spring 76, one end of which bears against a portion of the frame and the other end of which bears against a stop on the plunger. The rear end of the plunger is connected to a pivoted lever 77, the free end of which bears against the bolt 78 of a lock 79. The key portion of this lock projects through the casing and the lock is operated by a suitable key 80 from the exterior of the casing. By this arrangement the mechanism may be set and then locked in this position so that it cannot be tampered with by unauthorized persons.

Figure 15:
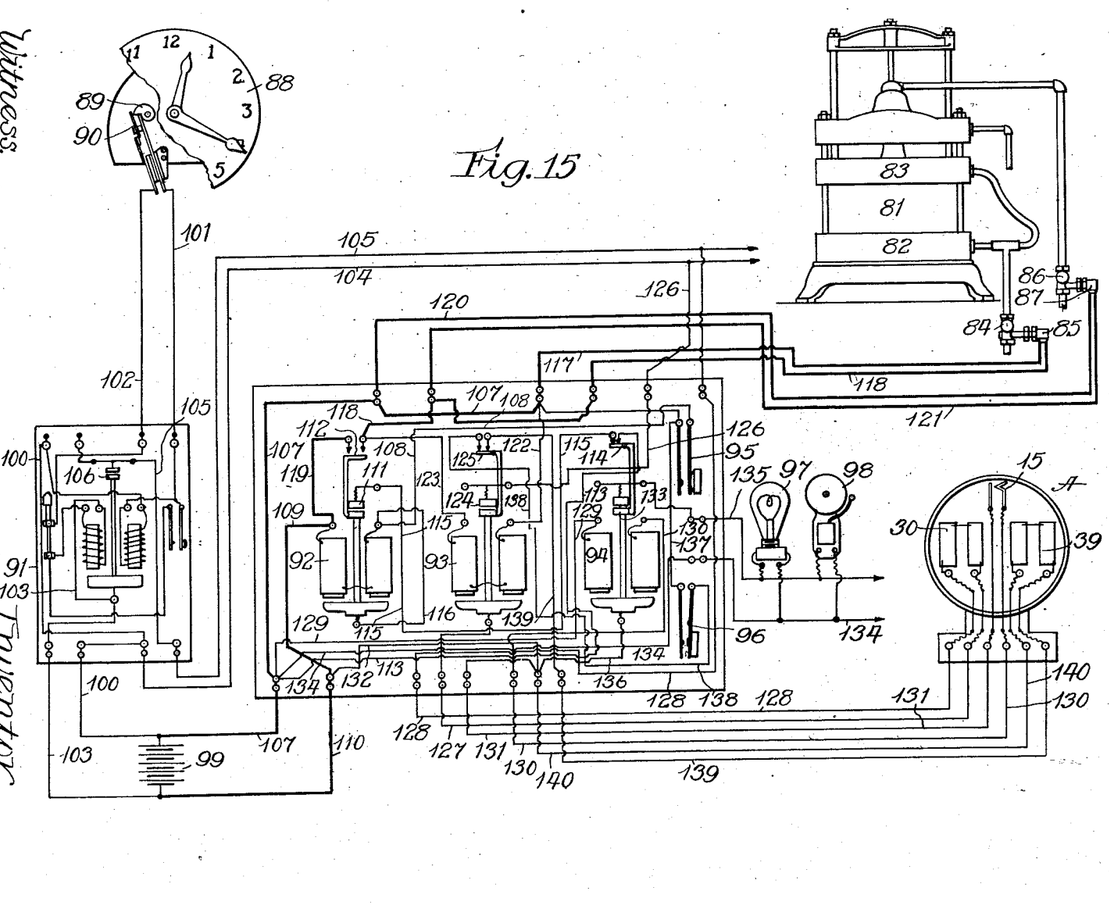
Fig. 15 is a diagrammatic illustration of one application of my invention for controlling a process.

In Fig. 15 I have shown diagrammatically the indicator heretofore described as used in connection with the control of a hydraulically-operated vulcanizing press.

In this figure, the press 81 is shown as being of more or less standard construction and is provided with the "cooking" molds 82 and 83, into which steam is adapted to be admitted through the valve 84, this valve being controlled by a solenoid 85. The movable member 83 of the press is operated by suitable hydraulic means controlled through a valve 86, likewise operated by a solenoid 87. The indicator is shown diagrammatically at A.

The electromagnets 30 and 39 and the switch 15 are shown with their accompanying circuit connections. For controlling the impulse, or for sending an impulse once a minute through the magnet 30, I provide a master clock 88, the minute-hand shaft of which is provided with a cam 89, adapted once each revolution to close the switch 90. Also, to control the circuit through the magnet 30 I provide a relay 91, the windings of which are energized once every minute by the closing of the contacts of the switch 90. This relay is provided for directly controlling the circuit through the windings of the magnet 30. Relays 92 and 93 are provided for controlling the circuit through the electromagnet 39 and through the electromagnets 85 and 87, while a relay 94 is provided for controlling the circuit through the electromagnet 39. The switches 95 and 96, respectively, are provided for controlling the starting of the mechanism and for resetting the indicating device after the process has been completed. Suitable signals, such as a lamp 97 and a bell 98, are provided for visibly and audibly indicating the completion of the process.

In describing the operation of the mechanism, we will assume that all of the parts are in inoperative position. First, describing the minute relay mechanism, the operation of which is continuous, when the switch 90 is closed circuit is established from the battery 99 or other source of power by way of the conductor 100, through one winding of the magnet of the relay 91, thence by conductor 101 across the switch 90 and by conductor 102 through the other winding of the relay, and from thence by conductor 103 to the opposite side of the battery or other source of power.

It is thus seen that the operation of the relay occurs periodically, and when the armature of the relay is attracted by the magnets once every minute it closes a circuit through what may be termed the minute-impulse circuit, as follows: from the positive side of the battery to conductor 104, thence through the minute-impulse circuit, which will be more fully described hereafter, to the conductor 105, thence across the switch 106 of the relay and by conductor 103 to the opposite side of the battery. This minute-impulse circuit is closed once every minute for the purpose of sending through the electromagnet 30, when the minute-impulse circuit is further completed, a minute impulse to operate the indicator and controller. Assuming now that the switch 95 is closed, circuit is established from the positive side of the battery 99 by conductor 107, across the switch 95, thence by conductor 108 through the windings of the magnet of the relay 92, thence by conductors 109 and 110 to the opposite side of the battery. Relay 92 is thus energized and immediately the magnet attracts its armature, closing the circuit through the switches 111 and 112, which normally stand open. The closing of the circuit through the switch 111 completes a circuit around the switch 95, so that the switch 95 can be released and opened and at the same time the circuit through the windings of the relay 92 remain closed. This circuit is as follows: from conductor 107 by way of conductor 113, across switch 114 of relay 94, which switch is normally closed, by conductor 115 across the switch 111, by conductor 116 through the windings of the magnet of relay 92 and by conductors 109 and 110 back to the opposite side of the circuit. The closing of the switch 112 by the operation of the relay 92 closes the circuit through the electromagnets 85 and 87 to open the valves 84 and 86, thereby admitting hydraulic pressure to the press and at the same time admitting steam to the molds of the press.

The circuit through the electromagnet 85 is established from the positive side of the battery 99 by conductors 107 and 117, through the windings of the solenoid 85, thence by conductor 118, across switch 112 by conductors 119, 109 and 110, back to the opposite side of the battery. This valve is thus opened by the energization of the solenoid 85. A second circuit is established from the positive side of the battery by conductor 107, conductor 120, through the windings of solenoid 87, thence by conductors 121, 118, across the switch 112 and by conductors 119, 109 and 110 back to the opposite side of the battery.

The process is thus started and at the same time circuit through the relay 93 is established. This circuit may be traced from the positive side of the battery 99, by conductor 107, conductor 122, through the windings of the magnet of relay 93, thence by conductor 123 across the switch 112 and by conductors 119, 109 and 110 to the opposite side of the circuit. The circuit to this relay being closed, the magnets attract their armature, thereby closing the switch 124 and opening the normally closed switch 125. The closing of the switch 124 establishes a circuit from conductor 104 of the minute-impulse circuit by conductor 126, across the switch 124, thence by conductor 127 through the windings of the magnet 30, thence by conductor 128 to the opposite side 105 of the minute-impulse circuit, so that upon each impulse being sent over this circuit the electromagnet 30 will be energized to move the time-indicator finger 4 of the time-controller A one step.

At the expiration of the period for which the process is intended to be continued, the switch 15 will be closed. This establishes a circuit through the windings of the relay 94 as follows: from the positive side of the battery by conductors 107 and 129, through the magnet of the relay 94, thence by conductor 130, across the switch 15, by way of conductors 131, 132 and 110 to the opposite side of the battery 99. The energizing of this magnet immediately opens the switch 114, thereby opening the circuit of the relay 92, which in turn opens the switch 112, opening the circuit of relay 93 to disconnect the magnet 30 from the impulse circuit and allow switch 125 to close. The opening of switch 112 likewise opens the circuit through the solenoids 85 and 87, thereby allowing valves 84 and 86 to close, cutting off the steam in the press and shutting off the process.

The operation of the relay 94, when the armature of its magnet is attracted, closes a switch 133, thereby establishing a circuit through the signals 97 and 98, as follows: from the positive side of the line by conductors 107, 134, through the signals which are connected in parallel, and thence by conductor 135 across the switch 133 and by conductors 136, 132 and 110 back to the opposite side of the line. This signal continues to operate until the apparatus is reset by closing of the circuit through the magnet 39. To close this circuit switch 96 is closed, it being remembered that switch 125, when the relay 93 is in inoperative position, is closed. The circuit through the magnet 39 will be established from the positive side of the line, by conductors 107 and 137, across the switch 96, by conductor 138, across the switch 125, by conductor 139 through the windings of the magnet 39, thence by conductors 140, 132 and 110 to the opposite side of the line. The opening of this circuit restores the indicator to normal position, thereby opening switch 15, which opens the circuit through the relay 92, restoring all of the parts to normal position.

As soon as the vulcanizing press has been made ready, the above-described cycle of operations may be again repeated by the closing of the switch 95. It is thus seen that after the process has been once started, the control of the same is entirely removed from the operators, and the length of time that the tire or other article remains in the vulcanizing press cannot be shortened by the operator. It is seen that the switch 15 cannot, of course, be opened during the continuation of the process by the closing of the switch 96, because the circuit controlled by this switch is also controlled by the switch 125, which is maintained open as long as the relay 93 is in operative position, so that in no way can the operator shorten the period of vulcanization.

At the same time, as soon as the process has been completed, it is automatically stopped by the closing of the switch 15, which through the relays above described operates the solenoids 85 and 87 to cut off the pressure and steam of the press. At the same time that the process is stopped, a signal is given, both audibly and visibly, by means of the bell 98 and light 97, to the operators that the process is completed and the article may be removed.

It is also to be observed that during the continuation of the process the operator may at any time observe just how much more time must elapse before the process is completed, thereby enabling him to make such preparations as are necessary for the immediate removal of the article from the press upon the completion of the process.

Figure 16:
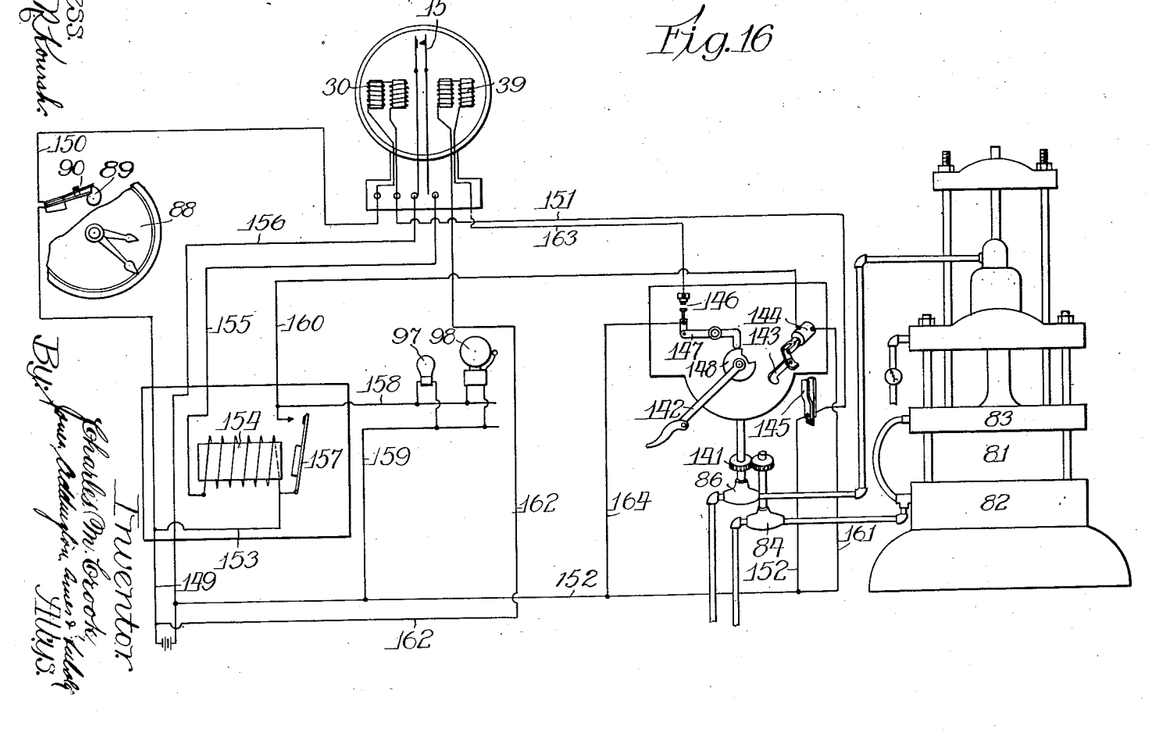
Fig. 16 is a diagrammatic view showing another application of my invention for controlling a process.

In Fig. 16 I have illustrated a modified application of my invention. In the structure illustrated in Fig. 16, instead of having the valves to the vulcanizing press automatically closed at the end of the predetermined period, the indicating and signaling device indicates the end of the period and automatically releases the valve-controlling handle, so that the operator may close the valves and thereby stop the process. After the process has once been started, however, it cannot be stopped until the expiration of the predetermined period. In the structure diagrammatically illustrated in Fig. 16, the valves 84 and 86, respectively, control the admission of steam to the vulcanizing press 81 and the admission of pressure to the press to cause the same to operate. These valves are intergeared at 141, so that they will operate together, and are operated by a handle 142. This handle, when moved to the right, opens the valves to start the press, and when it reaches the limit of its movement to the right is engaged and locked by a locking latch 143 controlled by a solenoid 144. When moved to its position to open the valves, the handle 142 closes a switch 145, and in its movement in closing the valve the handle operates a switch 146, the movable member of the switch being mounted on a lever 147 having one end theerof in the path of a cam 148 adapted to rotate with the handle 142, so that in the movement of the handle 142 the switch 146 is automatically closed. The minute-impulse solenoid 30 of the indicator A includes in its circuit the minute-impulse switch 90 of the master-clock mechanism, as in the structure illustrated in Fig. 15, and when the handle 142 is moved over to start the process, by admitting steam and pressure to the press 81, circuit is established by the closure of the switch 145 from the positive side of the line, by way of conductor 149, through the minute-impulse switch conductor 150, through the windings of the minute-impulse magnet 30, conductor 151, across the switch 145 and back to the negative side of the line by conductor 152. The circuit through the minute-impulse magnet 30 is thus completed and the minute impulse is sent over this circuit once each minute by the closing of the switch 90. When the handle 142 has been moved to its position to the right for starting the process, it is locked in this position by the latch 143, which drops over the handle and prevents the same from being moved to the left or to a position to stop the process, in practice it being understood that the switch 145 and the latch 143 and its operating parts, as well as the switch 146, will be inclosed to prevent access thereto by the operator. As soon as the predetermined time has elapsed the switch 15 of the indicating mechanism A is closed, thereby establishing a circuit by the way of conductor 153, through the winding of the relay magnet 154, thence by the conductor 155, across the switch 15, and thence by conductor 156 back to the opposite side of the line. The magnet 154, being energized, attracts its armature, closing the switch 157, thereby establishing a circuit from the conductor 153, across the switch 157, by conductor 158, through the visual signal 97 and the audible signal 98, and thence by conductors 159 and 152 back to the opposite side of the line. The operator is thus warned that the process is completed and that the steam and pressure should be cut off. At the same time that circuit is established through the signals 97 and 98 a circuit is established by way of conductor 160 through the winding of the magnet 144 and thence by conductors 161 and 152 back to the opposite side of the line. The latch 143 is thereby released and the operator can move the handle 142 to the left, shutting off the heat and pressure to the press. As he moves the handle to the left the end of the lever 147 drops in the notch in the cam 148, thereby momentarily closing the switch 146. This establishes a circuit from the positive side of the line by conductor 162, through the winding of the resetting magnet 39 of the time-controlling and indicating mechanism, and thence by the way of conductor 163 across the switch 146 and by conductors 164 and 152 back to the opposite side of the line. The mechanism is thus reset, opening the switch 15, permitting the relay 154 to open, and thereby opening the circuit through the signaling devices and through the solenoid 144, so that the latch 143 will drop into locking position again, ready for another operation. It is thus seen from the above that after the process has once been started the control of the same is removed from the operator, and the process cannot be again stopped until the predetermined time has elapsed, thereby preventing undercooking in the vulcanizing process.

Having thus described my invention, what I claim as new and desire to secure by Letters Patent, is:—

1. The combination with a switch, of a tripping mechanism for operating said switch when it reaches a predetermined position, a positive stop, means for causing said stop to travel in a definite path, means for setting said stop at predetermined distances from said switch, means for retracting said tripping mechanism to said stop, and means for moving said tripping mechanism toward said switch at a predetermined rate of speed.

2. The combination with a shaft, of a rotatable indicator mounted thereon, an indicating dial coöperating therewith and having the indicating numerals progressing in a counterclockwise direction from zero, means for rotating said indicator in a clockwise direction toward said zero point, an adjustable positive stop, means for causing said stop to travel in a definite path, and means for retracting said indicator to said adjustable stop.

3. The combination with a switch, of a rotating shaft, a trip mounted on said shaft adapted to operate said switch, the operating point of said trip being constant, an electromagnetically-operated driving mechanism for operating said shaft, means placed in operative condition by the rotation of said shaft in a clockwise direction under the influence of said driving mechanism for turning said shaft in a counter-clockwise direction when disconnected from said driving mechanism, and means for disconnecting said shaft from the driving mechanism.

4. The combination with a switch, of a movable tripping device therefor arranged to trip said switch always at the same point in its travel, an adjustable positive stop, means for causing said stop to travel in a definite path, means for retracting said tripping device to said stop, and an indicator for indicating the movement of said tripping device.

5. The combination with a switch, of a tripping device therefor arranged to trip said switch after the lapse of a predetermined period, an adjustable positive stop for varying said period, means for causing said stop to travel in a definite path, means for retracting said device to said stop, and an indicator showing at any interval the amount of time remaining before the switch is tripped.

6. The combination with a switch, of a tripping device therefor, an operating mechanism for said tripping device for moving the same toward tripping position at a uniform speed, an adjustable positive stop, means for causing said stop to travel in a definite path, means for retracting said tripping device from tripping position to said stop, and an indicator having a member movable with said tripping device and having indicating numbers progressing from the tripping point of the tripping device.

7. The combination with a process apparatus, of means controlling the stopping of said apparatus, a timing mechanism started when said apparatus is started controlling said means to permit said apparatus to be operated to stop the process and the stopping of said timing mechanism after the lapse of a predetermined period, means for preventing the operation of said apparatus to stop the process after the timing mechanism has started until the timing mechanism has completed its cycle of movement, and an indicator for indicating at any time during the operation of said apparatus the period remaining before said process is completed.

8. The combination with a process apparatus, of electromagnetic means controlling the operation of said apparatus to stop the process, a switch controlling the circuit of said means, a moving trip operating said switch at a constant point in its movement, means for retracting said trip from said point, a stop for limiting the retractile movement of said trip, means for causing said stop to travel in a definite path, and means for adjusting the stop to vary the period elapsed before said switch is operated.

9. The combination with a process apparatus, of electromagnetic means for preventing the operation of said apparatus to stop the process and a timing means therefor arranged to be set in operation when the process is started and controlling the circuit of said electromagnetic means after the lapse of a predetermined period to permit said process to be stopped, and means for resetting said timing means when the process is stopped.

10. The combination with an indicator having the numerals thereon progressing from zero in a counter-clockwise direction, of a pointer operating therewith and operating in a clockwise direction from its starting point, said pointer being rendered independent of the operator after once being set in motion and means for adjusting the starting-point of said indicator.

11. The combination with an indicator having the numerals thereon progressing from zero in a counter-clockwise direction, of a pointer coöperating therewith and operating in a clockwise direction from its starting-point, said pointer being rendered independent of the operator after once being set in motion, means for adjusting the starting point of said indicator, and electromagnetic means for operating said indicator.

12. The combination with an indicator having numerals thereon progressing from zero in a counter-clockwise direction, of a pointer coöperating therewith and operating in a clockwise direction from its starting point, means for adjusting the starting-point of said indicator, an electromagnet for operating said indicator and a circuit for said magnet, including a source of power, means for closing the circuit through said magnet at regular intervals and a switch for connecting said magnet in circuit to start the indicator moving, and a switch operated when said indicator reaches the zero point.

13. The combination with an indicator having numerals thereon progressing from zero in a counter-clockwise direction, of a pointer coöperating therewith and operating in a clockwise direction from its starting point and rendered independent of the operator after once being set in motion, means for adjusting the starting-point of said indicator, and electromagnetic means for operating said indicator, a switch operated when said indicator reaches the zero point, and an electromagnetic instrumentality controlled by said switch.

14. The combination with an indicator having the numerals thereon progressing from zero in a counter-clockwise direction, of a pointer coöperating therewith and operating in a clockwise direction from its starting point, means for adjusting the starting-point of said indicator, an electromagnet for operating said indicator and a circuit for said magnet, including a source of power, and means for closing the circuit through said magnet at regular intervals, a switch operated when said indicator reaches the zero point, and an electromagnet for resetting said indicator after the switch has been operated.

15. The combination with an indicator having the numerals thereon progressing from zero in a counter-clockwise direction, of a pointer coöperating therewith and operating in a clockwise direction from its starting point, means for adjusting the starting-point of said indicator, means for locking said adjusting means, an electromagnet for operating said indicator and a circuit for said magnet including a source of power, and means for closing the circuit through said magnet at regular intervals and a switch operated when said indicator reaches the zero point.

16. The combination with an indicator having the numerals thereon progressing from zero in one direction, of a pointer coöperating therewith and operating in an opposite direction from its starting point, and rendered independent of the operator after once being set in motion, means for adjusting the starting-point of said indicator, an electromagnet for operating said indicator.

17. The combination with a process apparatus and a time-indicating device, of means for starting said apparatus and indicating device simultaneously, and means for preventing the stopping of said apparatus and indicator until the said time-indicating device has completed its cycle.

18. The combination with a movable trip having a fixed tripping point, means for retracting said trip from said point, a key-controlled adjustable stop for determining the distance from said point the trip is retracted, and means for progressively moving said trip forward from said stop toward the tripping point at a predetermined rate of travel.

19. A time-controlled mechanism, operable means which it is desired shall be operated after the lapse of a predetermined period of time, movable means for controlling the instant of operation of said operable means, means whereby the rate of movement of said movable means in one direction is controlled by said time-controlled mechanism, means for returning said movable means after its time-controlled movement, movable means for positively limiting said return movement to determine the duration of the time-controlled movement, and means for causing said limiting means to travel in a definite path.

20. A time-controlled mechanism, operable means which it is desired shall be operated after the lapse of a predetermined period of time, movable means for controlling the instant of operation of said operable means, means whereby the rate of movement of said movable means in one direction is controlled by said time-controlled mechanism, means for returning said movable means after its time-controlled movement, movable means for positively limiting said return movement to determine the duration of the time-controlled movement, and manually operable means for adjusting said limiting means.

21. A time-controlled mechanism, operable means which it is desired shall be operated after the lapse of a predetermined period of time, movable means for controlling the instant of operation of said operable means, means whereby the rate of movement of said movable means in one direction is controlled by said time-controlled mechanism, means for returning said movable means after its time-controlled movement, movable means for positively limiting said return movement to determine the duration of the time-controlled movement, and indicating means for indicating the adjustment of said adjusting means.

22. An electrically driven time-controlled mechanism, operable means which it is desired shall be operated after the lapse of a predetermined period of time, movable means for controlling the instant of operation of said operable means, means whereby the rate of movement of said movable means in one direction is controlled by said time-controlled mechanism, means for returning said movable means after its time-controlled movement, movable means for positively limiting said return movement to determine the duration of the time-controlled movement, and means for causing said limiting means to move in a definite path.

23. A time-controlled mechanism comprising an electro-magnet, operable means which it is desired shall be operated after the lapse of a predetermined period of time, movable means for controlling the instant of operation of said operable means, means whereby the rate of movement of said movable means in one direction is controlled by said time-controlled mechanism, means for returning said movable means after its time-controlled movement, movable means for limiting said return movement to determine the duration of the time-controlled movement, and means for causing said limiting means to move in a definite path.

24. A time-controlled ratchet operated mechanism, operable means which it is desired shall be operated after a lapse of a predetermined period of time, movable means for controlling the instant of operation of of said operable means, means whereby the rate of movement of said movable means in one direction is controlled by said time-controlled mechanism, means for returning said movable means after its time-controlled movement, movable means for limiting said return movement to determine the duration of the time-controlled movement, and means for causing said limiting means to move in a definite path.

25. A time-controlled mechanism, an electric switch which it is desired shall be operated after the lapse of a predetermined period of time, movable means for controlling the instant of operation of said switch, means whereby the rate of movement of said movable means in one direction is controlled by said time-controlled mechanism, means for returning said movable means after its time-controlled movement, movable means for positively limiting said return movement to determine the duration of the time-controlled movement, and means for causing said limiting means to move in a definite path.

26. A time-controlled mechanism, operable means which it is desired shall be operated after a lapse of a predetermined period of time, rotatable means for controlling the instant of operation of said operable means, means whereby the rate of movement of said rotatable means in one direction is controlled by said time-controlled mechanism, means for returning said movable means after its time-controlled movement, movable means for positively limiting said return movement to determine the duration of the time-controlled movement, and means for causing said limiting means to move in a definite path.

27. A time-controlled mechanism, operable means which it is desired shall be operated after the lapse of a predetermined period of time, movable means for controlling the instant of operation of said operable means, ratchet means whereby the rate of movement of said movable means in one direction is controlled by said time-controlled mechanism, means for returning said movable means after its time-controlled movement, and movable means for limiting said return movement to determine the duration of the time-controlled movement.

28. A time-controlled mechanism, operable means which it is desired shall be operated after the lapse of a predetermined period of time, movable means for controlling the instant of operation of said operable means, means whereby the rate of movement of said movable means in one direction is controlled by said time-controlled mechanism, spring means for returning said movable means after its time-controlled movement, and means for limiting said return movement for determining the duration of the time-controlled movement.

29. A time-controlled mechanism, operable means which it is desired shall be operated after the lapse of a predetermined time, movable means for controlling the instant of operation of said operable means, means whereby the rate of movement of said movable means in one direction is controlled by said time-controlled mechanism, means for returning said movable means after its time-controlled movement, manually adjustable means for positively limiting said return movement to determine the duration of the time-controlled movement, and means for causing said limiting means to move in a definite path.

30. A time-controlled mechanism, operable means which it is desired shall be operated after the lapse of a predetermined period of time, movable means for controlling the instant of operation of said operable means, transmission means between said time-controlled means and movable means whereby the rate of movement of said movable means in one direction is controlled by said time-controlled means, means for returning said movable means after its time-controlled movement, movable means for positively limiting said return movement to determine the duration of said time-controlled movement, and means for causing said limiting means to travel in a definite path.

31. A time-controlled mechanism, operable means which it is desired shall be operated after the lapse of a predetermined period of time, movable means for controlling the instant of operation of said operable means, means whereby the rate of movement of said movable means in one direction is controlled by said time-controlled mechanism, spring means for returning said movable means after its time-controlled movement, a releasable detent for releasing said means for its spring operated movement, and means for limiting said return movement for determining the duration of said time-controlled movement.

32. A time-controlled mechanism, operable means which it is desired shall be operated after a lapse of a predetermined period of time, movable means for controlling the instant of operation of said operable means, transmission means between said time-controlled means and movable means whereby the rate of movement of said movable means in one direction is controlled by said time-controlled mechanism, means for returning said movable means after its time-controlled movement, means for limiting said return movement to determine the duration of its time-controlled movement, and means for disconnecting the transmission between said time-controlled means and said movable means to permit the return movement.

33. A time-controlled mechanism, operable means which it is desired shall be operated after a lapse of a predetermined period of time, movable means for controlling the instant of operation of said operable means, transmission means between said time-controlled means and said movable means, whereby the rate of movement of said movable means in one direction is controlled by said time-controlled mechanism, spring means for returning said movable means after its time-controlled movement, means for limiting said return movement to determine the duration of said time-controlled movement, and means for disconnecting the transmission between said time-controlled means and said movable means to permit said return movement.

34. A time-controlled mechanism, operable means which it is desired shall be operated after the lapse of a predetermined period of time, movable means for controlling the instant of operation of said operable means, transmission means between said time-controlled means and said movable means, whereby the rate of movement of said movable means in one direction is controlled by said time-controlled mechanism, means for returning said movable means after its time-controlled movement, means for limiting said return movement to determine the duration of said time-controlled movement, and means for disconnecting the transmission between said time-controlled means and said movable means to permit the return movement, said disconnecting means comprising a clutch.

35. An apparatus for carrying out a process, means for initiating and terminating the operation of the apparatus to start and stop the process, and time-controlled means for preventing the termination of the process before the predetermined time has elapsed, said first means comprising a lever, and said preventing means comprising a latch coöperating with said lever.

36. An apparatus for carrying out a process, means for initiating and terminating the operation of the apparatus to start and stop the process, time-controlled means for use in controlling the length of operation of the apparatus, and means for initiating the operation of the time-controlled means, comprising an electric switch controlled by said initiating and terminating means.

37. An apparatus for carrying out a process, means for initiating and terminating the operation of the apparatus to start and stop the process, time-controlled means for use in controlling the length of operation of the apparatus, means for initiating the operation of the time-controlled means, controlled by said initiating and terminating means, said means for initiating the operation of the time-controlled means comprising a clutch.

38. An apparatus for carrying out a process, means for indicating and terminating the operation of the apparatus to start and stop the process, time-controlled means for use in controlling the length of operation of the apparatus, means for initiating the operation of the time-controlled means, controlled by said initiating and terminating means, said means for initiating the operation of the time controlled means comprising a clutch, and resetting means comprising a spring for returning said time-controlled means when released by said clutch.

39. A time-controlled mechanism, operable means which it is desired shall be operated after a lapse of a predetermined period of time, movable means for controlling the instant of operation of said operable means, means whereby the rate of movement of said movable means in one direction is controlled by said time-controlled mechanism, means for indicating the lapse of time of said time-controlled movement, means for returning said movable means after its time-controlled movement, movable means for positively limiting said return movement to determine the duration of the time-controlled movement, and means for causing said limiting means to move in a definite path.

40. An apparatus for carrying out a process, means for initiating the operation of the apparatus to start the process, time-controlled means for use in controlling the termination of said process, and means whereby the operation of said initiating means to start the process will initiate the action of said time-controlled means.

In witness whereof I have hereunto subscribed my name.

CHARLES M. CROOK.